US00RE41166E

(19) United States
(12) Reissued Patent
Kim et al.

(10) Patent Number: US RE41,166 E
(45) Date of Reissued Patent: Mar. 23, 2010

(54) METHOD OF DRIVING SURFACE DISCHARGE PLASMA DISPLAY PANEL

(75) Inventors: Sang-Cheol Kim, Suwon (KR); Kwang-Hoon Jeon, Suwon (KR); Yoon-Phil Eo, Suwon (KR)

(73) Assignee: Samsung SDI Co., Ltd., Suwon (KR)

(21) Appl. No.: 10/318,398

(22) PCT Filed: Apr. 17, 1998

(86) PCT No.: PCT/KR98/00091

§ 371 (c)(1),
(2), (4) Date: Dec. 22, 1998

(87) PCT Pub. No.: WO98/48404

PCT Pub. Date: Oct. 29, 1998

Related U.S. Patent Documents

Reissue of:
(64) Patent No.: 6,256,001
Issued: Jul. 3, 2001
Appl. No.: 09/202,902
Filed: Dec. 22, 1998

(30) Foreign Application Priority Data

Apr. 22, 1997 (KR) ..... 97-14995

(51) Int. Cl.
*G09G 3/28* (2006.01)

(52) U.S. Cl. ..... 345/60; 345/67; 345/68; 315/169.4

(58) Field of Classification Search ..... 345/60–72, 345/204, 211, 208–209; 315/169.4, 169.3
See application file for complete search history.

(56) References Cited

U.S. PATENT DOCUMENTS 5,247,288 A * 9/1993 Warren et al. ..... 345/60
5,420,602 A 5/1995 Kanazawa
5,446,344 A * 8/1995 Kanazawa ..... 315/169.4
5,656,893 A 8/1997 Shino et al.
5,663,741 A 9/1997 Kanazawa
5,952,986 A 9/1999 Nguyen et al. ..... 345/68
5,959,619 A * 9/1999 Kameyama et al. ..... 345/204

(Continued)

FOREIGN PATENT DOCUMENTS

| | | | |
|---|---|---|---|
| EP | 0 657 861 | * | 6/1995 |
| JP | H7-160218 | | 6/1995 |
| JP | H7-175438 | | 7/1995 |
| JP | 2-160910 | | 6/1996 |
| JP | H8-160910 | | 6/1996 |
| JP | H8-212930 | | 8/1996 |
| JP | 8-212930 | | 8/1996 |

OTHER PUBLICATIONS

"A Full Color AC Plasma Display with 256 Gray Scale" by K. Yoshikawa, Y. Kanazawa, M. Wakitani, T. Shinoda, A. Ohtsuka; *Japan Display '92*—Proceedings of the 12th International Display Research Conference Oct. 12–14, 1992.

(Continued)

*Primary Examiner*—My-Chau T Tran
(74) *Attorney, Agent, or Firm*—H.C. Park & Associates, PLC

(57) ABSTRACT

A driving method of a surface discharge plasma display panel includes a resetting step, an addressing step and a sustained discharging step. In the resetting step, a first voltage is applied between the scan electrodes and the address electrodes to accumulate wall charges in the respective pixel by a facing discharge, and the wall-charges accumulated by the facing discharge are removed. In the addressing step, a second voltage is applied between a corresponding scan electrodes and selected address electrodes so that a facing discharge occurs, to form wall-charges in the selected pixels. In the sustained discharging step, a third alternating-current voltage is applied between the scan electrodes and the common electrodes so that a surface discharge occurs in the selected pixels.

8 Claims, 8 Drawing Sheets

U.S. PATENT DOCUMENTS

| | | | | | |
|---|---|---|---|---|---|
| 5,969,478 | A | | 10/1999 | Shino et al. | |
| 5,973,655 | A | * | 10/1999 | Fujisaki et al. | 345/63 |
| 6,008,588 | A | * | 12/1999 | Fujii | 315/169.3 |
| 6,072,279 | A | | 6/2000 | Shino et al. | |
| 6,100,859 | A | | 8/2000 | Kuriyama et al. | |
| 6,118,220 | A | | 9/2000 | Shino et al. | |
| 6,124,849 | A | | 9/2000 | Kazuhiro | |
| 6,150,766 | A | | 11/2000 | Shino et al. | |
| 6,181,305 | B1 | * | 1/2001 | Nguyen et al. | 345/60 |
| 6,288,693 | B1 | * | 9/2001 | Song et al. | 345/68 |

OTHER PUBLICATIONS

The Pioneer Entities' Preliminary invalidity Contentions Pursuant to Patent Local Rules 2–2 and 3–4; pp. 1–10 and Exhibit B.

Notice of Motion and Motion of MEI and PNA to Dismiss U.S. Patent No. 6,256,001, dated Jun. 14, 2007.

Memorandum of Points and Authorities in Support of Panasonic's Motion to Dismiss U.S. Patent No. 6,256,001, dated Jun. 14, 2007.

Declaration of David M. Beckwith in Support of Memorandum of Points in Support of Panasonic's Motion to Dismiss U.S. Patent No 6,256,001, dated Jun. 14, 2007.

Preliminary invalidity Contentions of Matsushita Electric Industrial Co., and Defendant Panasonic Corporation of North America, dated Apr. 27, 2006.

First Supplemental Preliminary Invalidity Contentions of Matsushita Electric Co. and Defendant Panasonic Corporation of America, dated Jul. 10, 2006.

Second Supplemental Preliminary Invalidity Contentions of Matsushita Electric Co. and Defendant Panasonic Corporation of America, dated Jul. 25, 2006.

Supplemental Expert Report Relating to Invalidity of the Samsung SDI Patents, prepared by Michael J. Marentic, dated Mar. 30, 2007.

Supplemental Rebuttal Report of Michael J. Marentic Reponding to the Apr. 13, 2007 Supplemental Opposition Reports of Mr. Silzars (Regarding Invalidity of the '001 and '188 patents), Mr. Glickman (Regarding Infringement of the '463 and '890 patents), and Mr. Brown (Regarding Infringement of the '003, '598, '766, and '781 patents), prepared by Michael J. Marentic, dated Apr. 27, 2007.

Yoshikawa, K., et al. "A Full Color AC Plasma Display with 256 Gray Scale" *in Proc. 12th International Research Conference*, Oct. 12–14, 1992, pp. 605–608.

Corrected Samsung Entities' Opposition to Defendants' Motion to Dismiss U.S. Patent No. 6,256,001, dated Jun. 26, 2007.

Declaration of Olivia M. Kim in Support of Samsung's Opposition to Defendants' Motion to Dismiss U.S. Patent No. 6,256,001, dated Jun. 25, 2007.

Declaration of Dale Nixon in Suppoet of Samsung's Opposition to Defendants' Motion to Dismiss U.S. Patent No. 6,256,001, dated Jun. 25, 2007.

Rebuttal Expert Report of Aris K. Silzars for U.S. Patent No. 6,256,001, dated Aug. 24, 2006.

Rebuttal Expert Report of Aris K. Silzars for U.S. Patent No. 6,256,001 and U.S. Patent No. 6,954,188, dated Apr. 12, 2007.

Order Denying Motion of Defendant and Counterclaimant to Dismiss U.S. Patent No. 6,256,001, dated Jul. 9, 2007.

Expert Report Relating to Invalidity of the Samsung SDI Patents, prepared by Michael J. Marentic, dated Jul. 31, 2006.

* cited by examiner

METHOD OF DRIVING SURFACE DISCHARGE PLASMA DISPLAY PANEL

Matter enclosed in heavy brackets [ ] appears in the original patent but forms no part of this reissue specification; matter printed in italics indicates the additions made by reissue.

TECHNICAL FIELD

The present invention relates to a method of driving a surface discharge plasma display panel, and more particularly, to a method for driving a three-electrode surface-discharge alternating-current plasma display panel (AC PDP).

BACKGROUND ART

FIG. 1 shows an electrode pattern of a conventional surface discharge plasma display panel. FIG. 2 is a schematic sectional view of a pixel of FIG. 1. Referring to FIGS. 1 and 2, the conventional surface discharge plasma display panel includes address electrodes A1, A2, A3, . . . , Am, a first dielectric 21, a luminescent material 22, scan electrodes Y1, Y2, . . . , Yn−1, Yn, 231, 232, common electrodes X, 241, 242, a second dielectric 25, and a protective layer 26. Each of the scan electrodes Y1, Y2, . . . , Yn−1, Yn, includes an indium tin oxide (ITO) scan electrode 231 and a bus scan electrode 232. In the same manner, each of the common electrodes X, 241, 242 includes a common ITO electrode 241 and a common bus electrode 242. Gas for forming plasma is sealed between the protective layer 26 and a first dielectric 21.

The address electrodes A1, A2, A3, . . . , Am are coated on a lower substrate (not shown) of a first substrate in a predetermined pattern. The first dielectric 21 is coated on the address electrodes A1, A2, A3, . . . , Am. The luminescent material 22 is coated on the first dielectric 21 in a predetermined pattern. Depending on circumstances, without forming the first dielectric 21, the luminescent material 22 may be coated on the address electrodes A1, A2, A3, . . . , Am, in a predetermined pattern. The scan electrodes Y1, Y2, . . . , Yn−1, Yn, 231, 242 and the common electrodes X, 241, 242 are formed on an upper substrate (not shown) of a second substrate, such that they intersect with the address electrodes A1, A2, A3, . . . , Am. The respective intersections each define a corresponding pixel. The second dielectric 25 is coated on the scan electrodes Y1, Y2, . . . , Yn−1, Yn, 231, 232 and the common electrodes X, 241, 242. The protective layer 26 for protecting the panel from a strong electrical field is coated on the second dielectric 25.

In the prior art driving method of a surface discharge plasma display panel, a relatively high voltage is applied between the scan electrodes Y1, Y2, . . . , Yn−1, Yn, 231, 232 and the common electrodes X, 241, 242 to accumulate wall charges in the respective pixel by a surface discharge, and the wall-charges accumulated by the surface discharge are removed, in a resetting step. The conventional driving method is disclosed in U.S. Pat. No. 5,446,344.

FIG. 3 depicts a conventional driving method of a surface discharge plasma display panel.

In a first reset interval (a–b), a pulse of voltage Vaw, a pulse of voltage Vs+Vw, and 0 V are applied to the address electrodes Am, the common electrodes X, and the scan electrodes Y1, Y2, . . . , Yn, respectively. Here, the voltage Vs+Vw obtained by adding the voltage Vw to the scan voltage Vs is higher than the voltage Vaw. Accordingly, a relatively high voltage Vs+Vw is applied between the common electrodes X and the scan electrodes Y1, Y2, . . . , Yn, so that a surface discharge occurs between the common electrodes X and the scan electrodes Y1, Y2, . . . , Yn ('a' of FIG. 3). Positive (+) wall-charges are accumulated in the positive layer 26 of FIG. 2 under each of the scan electrodes 231, 232 of FIG. 2, and negative(−) wall-charges are accumulated in the positive layer 26 under the common electrodes 241, 242 of FIG. 2.

The voltage of the wall-charges accumulated during the first reset interval (a–b) is a re-dischargeable voltage. In a second reset interval (b–c), 0 V is applied to the address electrodes Am, the common electrodes X, and the scan electrodes Y1, Y2, . . . , Yn. Accordingly, due to the wall-charges accumulated during the first reset interval (a–b), a surface discharge occurs between the common electrodes X and the scan electrodes Y1, Y2, . . . , Yn. The wall-charges of all pixels then removed.

In an address step, in a state in which a pulse of voltage Vax is applied to the common electrodes X, scan pulses of a voltage −Vy are sequentially applied to each of the scan electrodes Y1, Y2, . . . , Yn. When the scan pulse is not applied, a negative voltage−Vsc which is a level lower than the voltage −Vy of the scan pulse is applied. When a pulse of the address voltage Va is applied to an address electrode Am selected while the scan pulse is applied to a scan electrode Y1, Y2, . . . , Yn, for example, during interval (c–d) for the scan electrode Y1, a facing discharge is performed in a corresponding pixel. This is because a voltage for facing discharge Va+Vy is applied between the corresponding scan electrode Y1, Y2, . . . , or Yn and the selected address electrode Am. At this time, when a negative voltage −Vsc which is lower than the voltage −Vy of the scan pulse is applied, the facing discharge stops. Positive(+) wall-charges are than accumulated under the scan electrodes 231, 232 of the selected pixel.

In a first sustaining discharge interval (g–h), a pulse of the voltage Vs/2 which is ½ the scan voltage Vs, 0V, and a pulse of the sustaining discharge voltage Vs, are applied to the address electrodes Am, the common electrode X, and the scan electrodes Y1, Y2, . . . , Yn, respectively. That is, in a state in which positive(+) wall-charges are accumulated under the scan electrode Y1, Y2, . . . , or Yn of the selected pixel, when a relatively high negative-voltage is applied between the scan electrodes Y1, Y2, . . . , Yn and the common electrodes X, a surface discharge occurs in the selected pixel. When the surface discharge is performed in the selected pixel, plasma is formed in a gas layer of a corresponding region, and a luminescent material 22 of FIG. 2 is excited by an UV-ray to emit light.

In a second sustaining discharge interval (i–j), a pulse of the voltage Vs/2 which is ½ the scan voltage Vs, and pulse of the sustaining discharge voltage Vs, and 0V, are applied to the address electrodes Am, the common electrodes X, and the scan electrodes Y1, Y2, . . . , Yn, respectively. That is, in a state in which wall-charges are accumulated, when a relatively high negative voltage is applied between the scan electrodes Y1, Y2, . . . , Yn and the common electrodes X, a surface discharge occurs in a selected pixel. Positive(+) wall-charges are then accumulated under the scan electrodes 231, 232 of the selected pixel, and negative(−) wall-charges are accumulated under the common electrodes 241, 242. When the surface discharge is performed in the selected pixel, plasma is formed in a gas layer of a corresponding region, and a luminescent material 22 is excited by a UV-ray to emit light. The operations of the first and second sustained discharge intervals are repeated during the sustaining discharge period, to thereby maintain the emission of light at the selected pixel.

In the conventional driving method, in the resetting step (interval a–c of FIG. 3), a pulse of a relatively high voltage Vs+Vw is applied between the common electrodes X and the scan electrodes Y1, Y2, . . . , Yn, so that a surface discharge occurs. Accordingly, the light of relatively high brightness is emitted from the unselected pixels, to thereby decrease the contrast of a display screen.

DISCLOSURE OF INVENTION

It is an object of the present invention to provide a driving method of a surface discharge plasma display panel for emitting the light of relatively low brightness from the pixels unselected in each sub-field.

To accomplish the above object of the present invention, a driving method of a surface discharge plasma display panel is adopted to a surface discharge plasma display panel having a first substrate and a second substrate space apart and facing each other, and common electrodes, scan electrodes, and address electrodes arranged between said first and second substrates, said common electrodes being arranged in parallel with said scan electrodes, said address electrodes being arranged orthogonal to said common electrodes and said scan electrodes to form respective intersections which each define a corresponding pixel.

The driving method of a surface discharge plasma display panel comprises a reset step, an address step, and a sustaining discharging step. In the reset step, a first voltage is applied between the scan electrodes and the address electrodes to accumulate wall charges in the respective pixel by a facing discharge, and the wall-charges accumulated by the facing discharge are removed. In the address step, a second voltage is applied between a corresponding scan electrodes and selected address electrodes so that a facing discharge occurs, to form wall-charges in the selected pixels. In the sustaining discharge step, a third alternating-current voltage is applied between the scan electrodes and the common electrodes so that a surface discharge occurs in the selected pixels.

In the reset step of the present invention, the wall charges to be removed are accumulated by the facing discharge. Accodingly, the light of a relatively low brightness is emitted from the pixels unselected in each sub-field.

Preferably, the reset step includes a first, a second and a third reset step. In the first reset step, a fourth voltage is applied between the scan electrodes and the common electrodes, and thereby remove remnant wall-charges from a previous sub-field, said fourth voltage has an opposite polarity to a voltage applied last in the sustained discharging step. In the second reset step, said first voltage is applied between the scan electrodes and the address electrodes, and thereby cause the facing discharge. In the third reset step, a fifth voltage is applied between the scan electrodes and the address electrodes, and thereby remove wall-charges accumulated by the facing discharge, said fifth voltage has an opposite polarity to said first voltage and lower than said first voltage. Also, the third reset step is shorter than the first and second reset steps. And, the third reset step is repeated.

BRIEF DESCRIPTION OF THE DRAWINGS

The above objects and advantages of the present invention will become more apparent by describing in detail a preferred embodiment thereof with reference to the attached drawings in which.

BEST MODE FOR CARRYING OUT THE INVENTION

Figure 4:
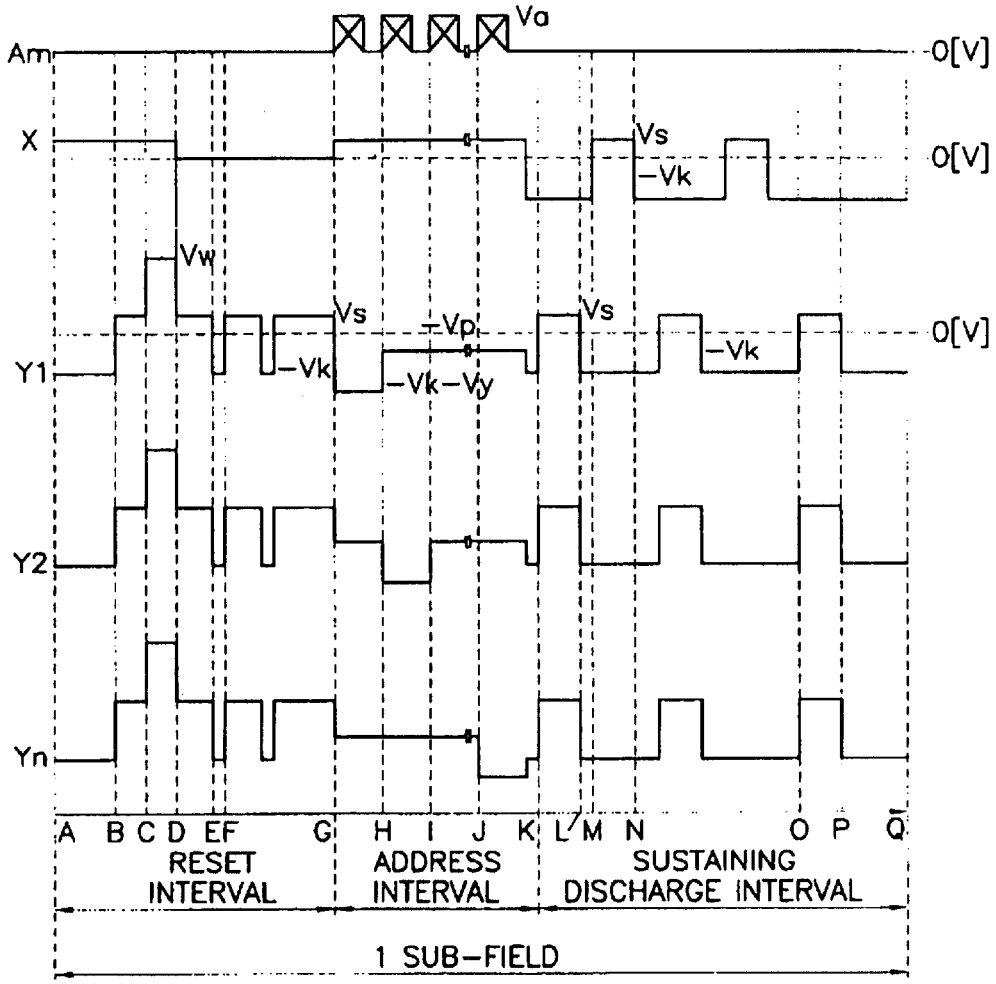
FIG. 4 is a diagram of voltage waveforms applied to electrodes according to a plasma display panel driving method based on an embodiment of the present invention.

FIG. 4 is a illustration of the voltage waveforms applied to electrodes according to a plasma display panel driving method based on an embodiment of the present invention. In the reset interval (A–G), a first voltage Vw is applied between the scan electrodes Y1, Y2, . . . , Yn and the address electrodes Am to accumulate wall charges in the respective pixel by a facing discharge, and the wall-charges accumulated by the facing discharge are removed. In the address interval (G–K), a second voltage Va+Vk+Vy is applied between a corresponding scan electrodes Y1, Y2, . . . , Yn and selected address electrodes Am so that a facing discharge occurs, to form wall-charges in the selected pixels. In the sustaining discharge interval (K–Q), a third alternating-current voltage Vs+Vk is applied between the scan electrodes Y1, Y2, . . . , Yn and the common electrodes X so that a surface discharge occurs in the selected pixels.

In the reset interval (A–G) of this embodiment, the wall charges to be removed are accumulated by the facing discharge. Accodingly, the light of relatively low brightness is emitted from the pixels unselected in each sub-field. Also, there are residual wall charges on the address electrodes Am in the reset interval (A–G), and thereby the second voltage Va+Vk+Vy applied in the address interval (G–K) can be lowered.

Three steps are sequentially performed in the reset interval (A–G). In the first reset step (interval A–B), a fourth voltage Vs+Vk is applied between the scan electrodes Y1, Y2, . . . , Yn and the common electrodes X, and thereby remove remnant wall-charges from a previous sub-field, the fourth voltage Vs+Vk has an opposite polarity to a voltage applied last in the sustained discharging interval (K–Q). In the second reset step (interval C–D), the first voltage Vw is applied between the scan electrodes Y1, Y2, . . . , Yn and the address electrodes Am, and thereby cause the facing discharge. In the third reset step (interval E–F), a fifth voltage Vk is applied between the scan electrodes Y1, Y2, . . . , Yn and the address electrodes Am, and thereby remove wall-charges accumulated by the facing discharge, the fifth voltage Vk has an opposite polarity to the first voltage Vw and lower than the first voltage Vw. The third reset interval (E–F) is shorter than the first (A–B) and second (C–D) reset intervals. Also, the third reset step (interval E–F) is repeated.

Figure 1:
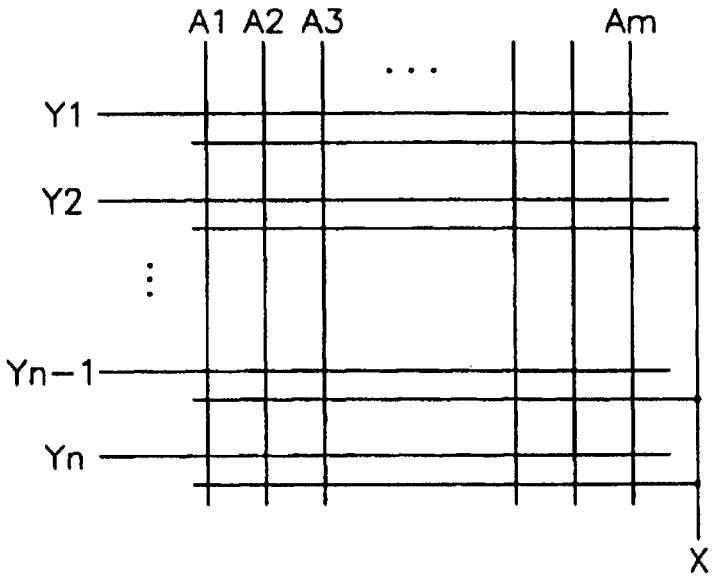
FIG. 1 is a diagram of a typical electrode pattern of a surface discharge plasma display panel.
Figure 2:
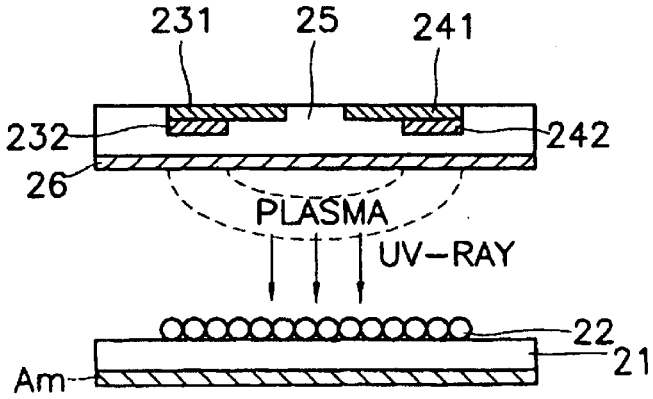
FIG. 2 is a schematic sectional view of a pixel of the pattern of FIG. 1.
Figure 3:
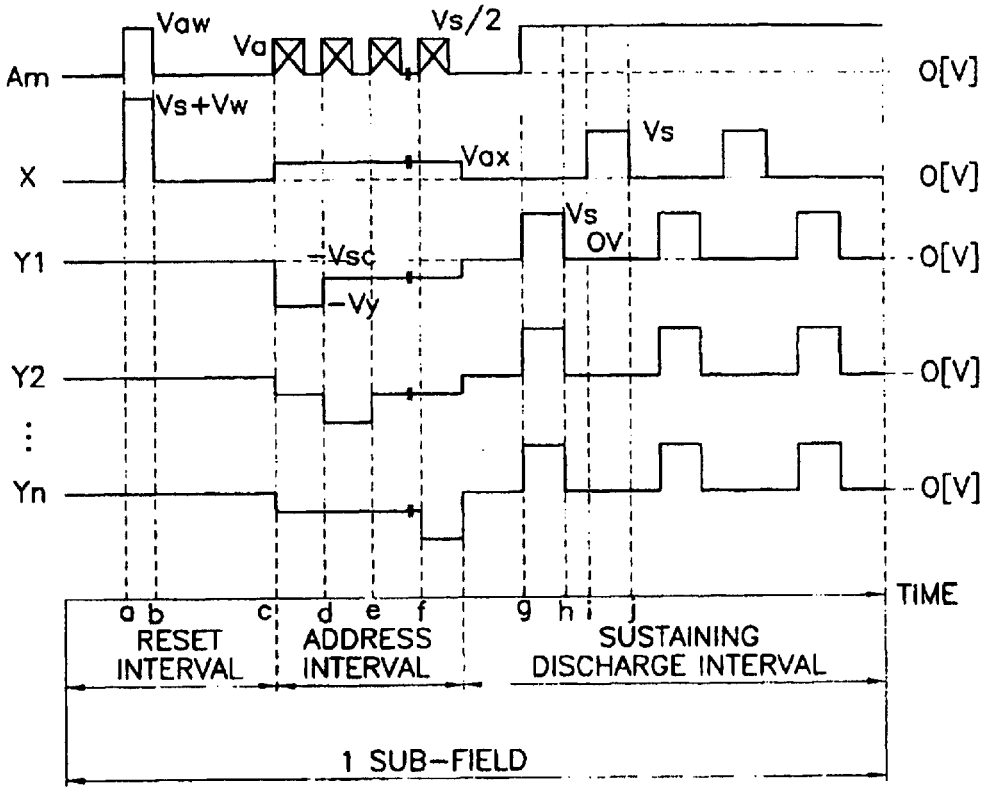
FIG. 3 (PRIOR ART)
FIG. 3 is a diagram of voltage waveforms applied to electrodes according to a plasma display panel driving method based on a prior art.
Figure 5:
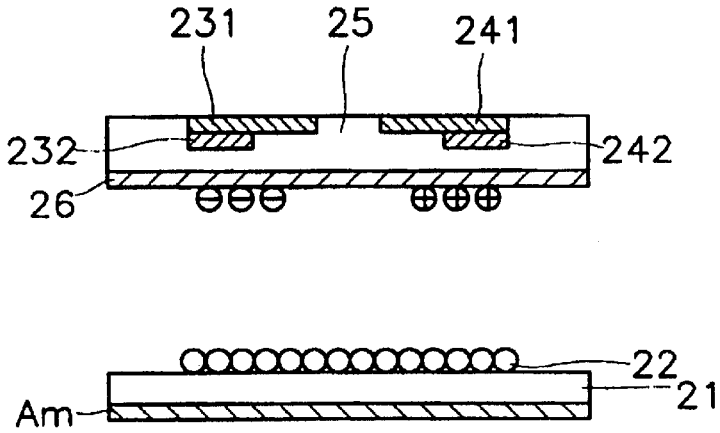
FIG. 5 is a diagram of the state of a selected pixel during a last sustaining discharge interval (O–P) of FIG. 4.

A driving method of FIG. 4 is adopted for the case that 0V, a negative(−) voltage −Vk of a relatively high level, for example, −140V, and a positive(+) voltage Vs of a relatively low level, for example, 40V, are applied to address electrodes Am, common electrodes X, and scan electrodes Y1, Y2, . . . , Yn, respectively. Here, negative(−) wall-charges are accumulated under the scan electrodes 231, 232 of a selected pixel, and positive(+) wall-charges are accumulated under the common electrodes 241, 242, as shown in FIG. 5. Reference numerals of FIG. 5 which are the same as those of FIG. 2 indicate identical elements. Meanwhile, wall-charges are not accumulated in unselected pixel regions.

Figure 6A:
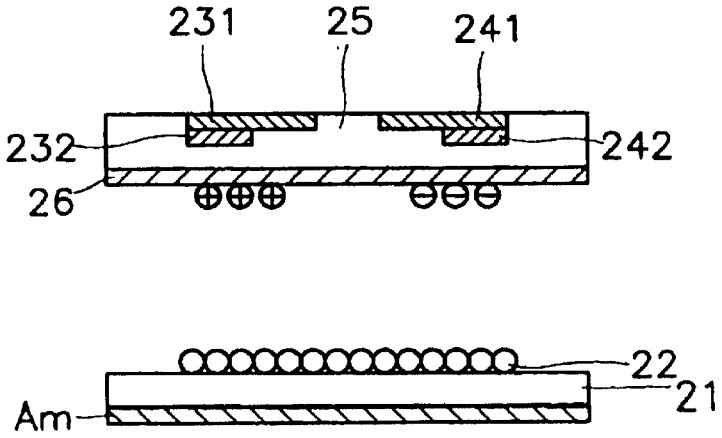
FIG. 6A is a diagram of the state of a unit pixel in a first reset interval (A–B) of FIG. 4.

In the first reset interval (A–B), 0V, a pulse of the positive (+) voltage Vs, and a pulse of the negative(−) voltage −Vk are applied to the address electrodes Am, the common electrodes X, and the scan electrodes Y1, Y2, . . . , Yn, respectively. That is, in a state in which the voltage of the address electrodes Am is maintained at 0V, a voltage applied between the common electrodes X and the scan electrodes Y1, Y2, . . . , Yn is a negative voltage Vs+Vk of the voltage −(Vs+Vk) of a final sustaining discharge interval of a previous sub-field. Accordingly, the wall-charges in the pixels selected in a previous sub-field are removed. Also, as shown in FIG. 6A, positive(+) wall-charges are accumulated in a protective layer 26 under each of the scan electrodes 231, 232 of the pixel selected in the previous sub-field, and negative(−) wall-charges are accumulated in the protective layer 26 under the common electrodes 241, 242. Reference numerals of FIG. 6A which are the same as those of FIG. 2 indicate identical elements. Meanwhile, wall-charges are not accumulated in a pixel region not selected from the previous sub-field.

Figure 6B:
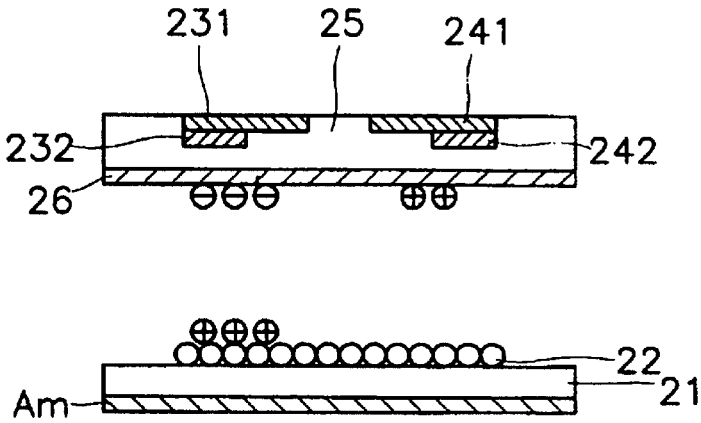
FIG. 6B is a diagram of the state of a unit pixel during a second reset interval (C–D) of FIG. 4.

In the second reset interval (C–D), 0V, a pulse of the positive(+) voltage Vs, and a pulse of the positive(+) voltage Vw for facing discharge, for example, 180 V, are applied to the address electrodes Am, the common electrodes X, and the scan electrodes Y1, Y2, . . . , Yn, respectively. That is, the relatively high voltage Vw is applied between the address electrodes Am and the scan electrodes Y1, Y2, . . . , Yn. Accordingly, a facing discharge occurs between the address electrodes Am of pixels where wall-charges are accumulated in the first reset interval (A–B), that is, the pixels selected from the previous sub-field, and the scan electrodes Y1, Y2, . . . , Yn. Meanwhile, a facing discharge does not occur between the address electrodes Am of pixels where wall-charges are not accumulated in the first reset interval (A–B), that is, the pixels not selected from the previous subfield, and the scan electrodes Y1, Y2, . . . , Yn. As shown in FIG. 6B, negative(−) wall-charges are accumulated in the protective layer 26 under the scan electrodes 231, 232 of each pixel selected from the previous sub-field, and the positive(+) wall-charges are accumulated in a luminescent material 22 of the address electrodes Am. Here, positive(+) wall-charges are accumulated in the protective layer 26 under the common electrodes 241, 242. Reference numerals of FIG. 6B which are the same as those of FIG. 2 indicate identical elements. Meanwhile, wall-charges are not accumulated in a pixel region not selected from the previous sub-field.

Figure 6C:
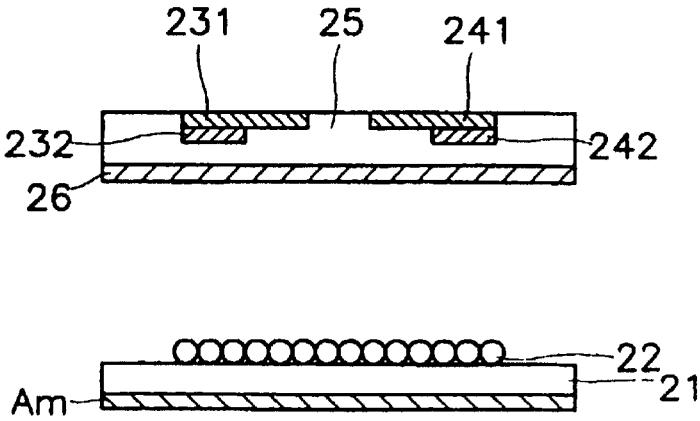
FIG. 6C is a of showing the state of a unit pixel in a third reset interval (E–F) of FIG. 4.

In the third reset interval (E–F), 0 V is applied to the address electrodes Am and the common electrodes X, and a pulse of the negative(−) voltage −Vk is applied to the scan electrodes Y1, Y2, . . . , Yn. The operation of the third reset interval is performed relatively quickly, so that the pulse width of the negative(−) voltage −Vk applied to the scan electrodes Y1, Y2, . . . , Yn, is relatively short. As shown in FIG. 4, the operation of the third reset interval (E–F) is sequentially performed again. Accordingly, as shown in FIG. 6C, the wall-charges of the pixels selected from the previous sub-field are removed. Nevertheless, there are residual wall charges on the address electrodes Am in the reset interval (A–G), and thereby the second voltage Va+Vk+Vy applied in the address interval (G–K) can be lowered. Reference numerals of FIG. 6C which are the same as those of FIG. 2 indicate identical elements.

Figure 7:
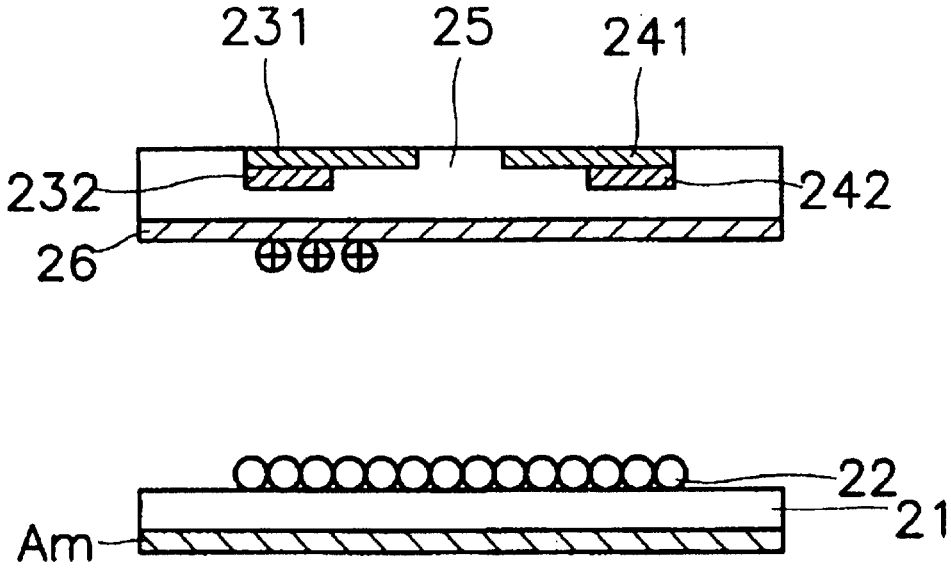
FIG. 7 is a of showing the state of a pixel selected during an address interval (G–K) of FIG. 4.

In the address period (G–K), in a state in which a pulse of the positive(+) voltage Vs is then applied to the common electrodes X, scan pulses of the negative voltage −Vk−Vy higher than the negative(−) voltage −Vk, for example, −180V, are sequentially applied to each of the scan electrodes Y1, Y2, . . . , Yn. When the scan pulse is not applied, a negative voltage −Vp lower than the negative(−) voltage −Vk, is applied. When an address voltage Va, for example, 80V, is applied to an address electrode Am selected while the scan pulse is applied to one of the corresponding scan electrodes Y1, Y2, . . . , or Yn, for example, G–H interval for the scan electrode Y1, facing discharge occurs in a corresponding pixel. This is because a voltage for facing discharge Vk+Vy+Va, for example, 260V, is applied between the corresponding scan electrode Y1, Y2, . . . , or Yn and a selected address electrode Am. Here, the negative voltage −Vk−Vy higher than the negative voltage −Vk is applied to each of the scan electrodes Y1, Y2, . . . , Yn, to thereby relatively lower the address voltage Va. When the negative voltage −Vp is applied when the facing discharge occurs, the facing discharge ceases. As shown in FIG. 7, positive(+) wall-charges are accumulated under the scan electrodes 231, 232 of a selected pixel. Reference numerals of FIG. 7 which are the same as those of FIG. 2 indicate identical elements.

Figure 8A:
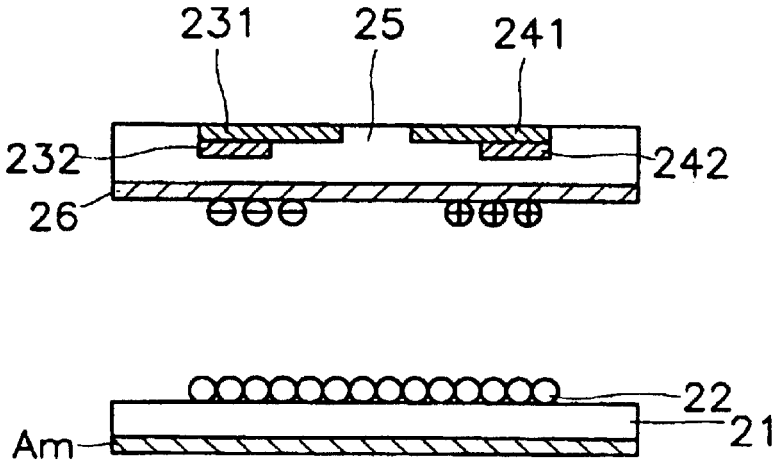
FIG. 8A is a of showing the state of a pixel selected during a first sustaining discharge interval (K–L) of FIG. 4

In the first sustaining discharge interval (K–L), 0 V is applied to the address electrodes Am, a pulse of the negative (−) voltage −Vk is applied to the common electrodes X, and a pulse of the positive(+) voltage Vs is applied to scan electrodes Y1, Y2, . . . , Yn. And thereby, surface discharges occur in the selected pixels. As shown in FIG. 8A, negative (−) wall-charges are accumulated under scan electrodes 231, 232 of the selected pixel, and positive(+) wall-charges are accumulated under the common electrodes 241, 242. Reference numerals of FIG. 8A which are the same as those of FIG. 2 indicate identical elements. When a surface discharge occurs in the selected pixel, plasma is formed in a gas layer of a corresponding region, and a luminescent material 22 is excited by a UV-ray, to emit light.

Figure 8B:
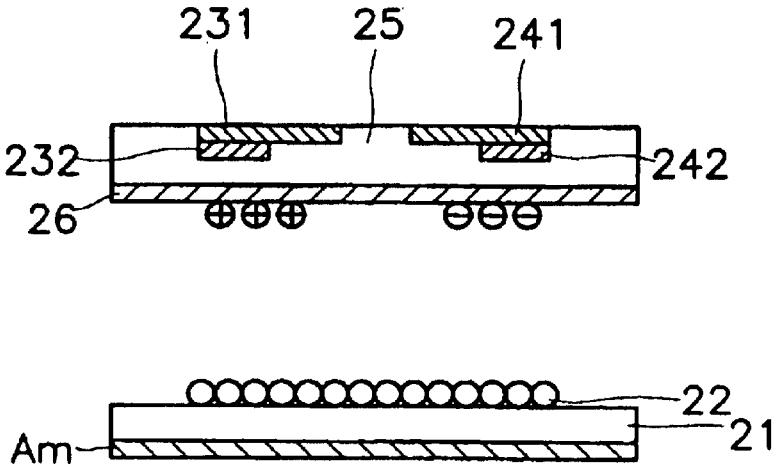
FIG. 8B is a of showing the state of a pixel selected during a second sustaining discharge interval (M–N) of FIG. 4

In the second sustaining discharge interval, 0 V is applied to the address electrodes Am, a pulse of the positive(+) voltage Vs is applied to the common electrodes X, and a negative (−) voltage −Vk is applied to the scan electrodes Y1, Y2, . . . , Yn. And thereby, surface discharges occur in the selected pixels. As shown in FIG. 8B, positive(+) wall-charges are accumulated under the scan electrodes 231, 232 of the selected pixel, and negative(−) wall-charges are accumulated under the common electrodes 241, 242. Reference numerals of FIG. 8B which are the same as those of FIG. 2 indicate identical elements, when a surface discharge occurs in the selected pixel, plasma is formed in a gas layer of a corresponding region, and the luminescent material 22 is excited by a UV-ray, to thereby emit light. The operations of the first and second sustaining discharge steps (interval K–N) are repeated during a predetermined sustaining discharge interval (K–Q), to maintain illumination of the selected pixel.

Figure 9:
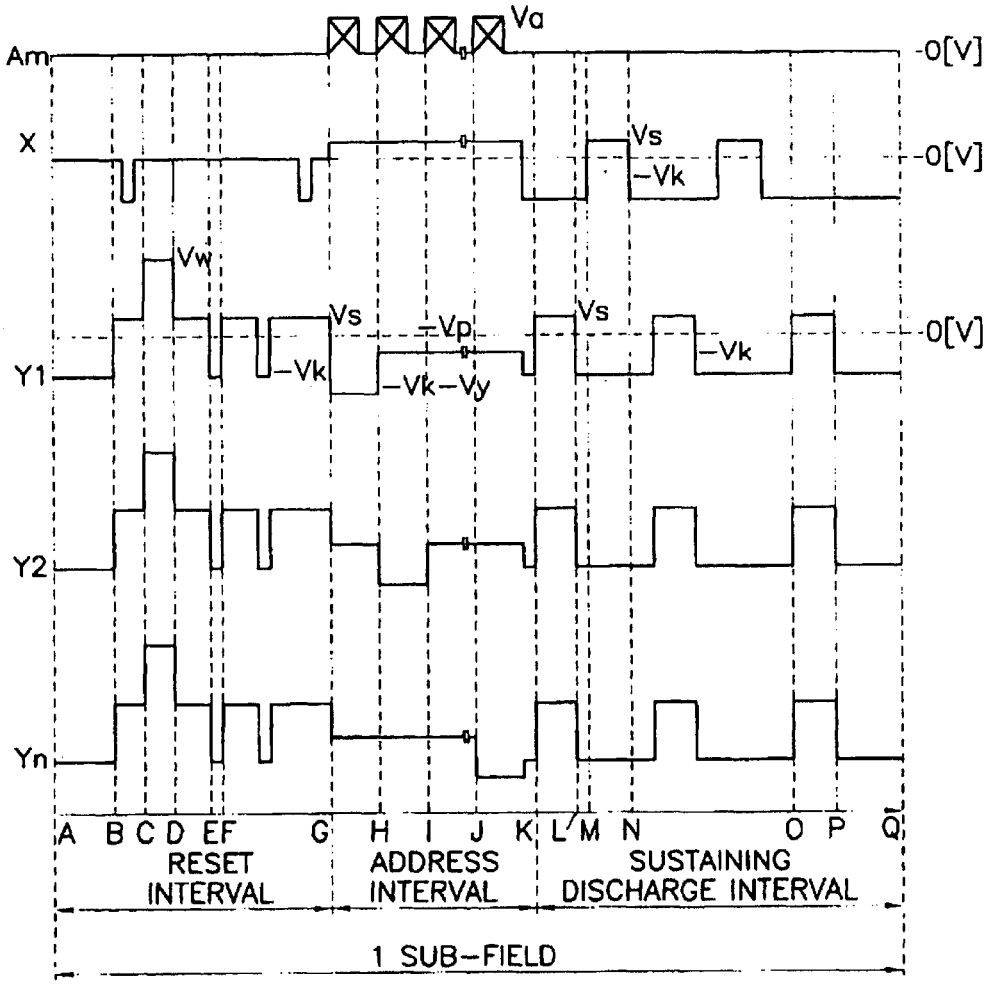
FIG. 9 is a of showing voltage waveforms applied to electrodes according to a plasma display panel driving method based on the other embodiment of the present invention.

FIG. 9 shows voltage waveforms applied to electrodes according to a plasma display panel driving method based on the other embodiment of the present invention. Comparing FIG. 9 to FIG. 4, the voltage waveform applied to the common electrodes X is changed in the reset interval (A–G). The operation in the address and sustaining discharge interval (G–Q) is same as that described above. So, referring to FIG. 9, the operation in only the reset interval (A–G) will be explained.

In the first reset interval (A–B), 0 V is applied to the Address electrodes Am and the common electrodes X, and a pulse of the negative(−) voltage −Vk are applied to the scan electrodes Y1, Y2, . . . , Yn. Accordingly, the wall-charges in the pixels selected in a previous sub-field are removed. Also, as shown in FIG. 6A, positive(+) wall-charges are accumulated in a protective layer 26 under each of the scan electrodes 231, 232 of the pixel selected in the previous sub-field, and negative(−) wall-charges are accumulated in the protective layer 26 under the common electrodes 241, 242. Meanwhile, wall-charges are not accumulated in a pixel region not selected from the previous sub-field.

In an additional reset interval (B–C), 0 V, a pulse of the positive(+) voltage +Vs, and a pulse of the negative(−) voltage −Vk are applied to the address electrodes Am, the scan electrodes Y1, Y2, . . . , Yn, and the common electrodes X, respectively. Accordingly, the wall-charges accumulated in the first reset interval (A–B) are removed.

In the second reset interval (C–D), 0V is applied to the address electrodes Am and the common electrodes X, and a a pulse of the positive(+) voltage Vw for facing discharge, for example, 180 V, are applied to the scan electrodes Y1, Y2, . . . , Yn. Accordingly, a facing discharge occurs between the address electrodes Am of pixels where wall-charges are accumulated in the first reset interval (A–B), that is, the pixels selected from the previous sub-field, and the scan electrodes Y1, Y2, . . . , Yn. Meanwhile, a facing discharge does not occur between the address electrodes Am of pixels where wall-charges are not accumulated in the first reset interval (A–B), that is, the pixels not selected from the previous sub-field, and the scan electrodes Y1, Y2, . . . , Yn. As shown in FIG. 6B, negative(−) wall-charges are accumulated in the protective layer 26 under the scan electrodes 231, 232 of each pixel selected from the previous sub-field, and the positive(+) wall-charges are accumulated in a luminescent material 22 of the address electrodes Am. Here, positive(+) wall-charges are accumulated in the protective layer 26 under the common electrodes 241, 242. Meanwhile, wall-charges are not accumulated in a pixel region not selected from the previous sub-field.

In the third reset interval (E–F), 0 V is applied to the address electrodes Am and the common electrodes X, and a pulse of the negative(−) voltage −Vk is applied to the scan electrodes Y1, Y2, . . . , Yn. The operation of the third reset interval is performed relatively quickly, so that the pulse width of the negative(−) voltage −Vk applied to the scan electrodes Y1, Y2, . . . , Yn, is relatively short. The operation of the third reset interval (E–F) is sequentially performed again. Accordingly, as shown in FIG. 6C, the wall-charges of the pixels selected from the previous sub-field are removed. Also, the additional reset interval (B–C) is repeated after the third reset interval (E–F), and thereby, most of the remnant wall charges can be removed. Nevertheless, there are residual wall charges on the address electrodes Am in the reset interval (A–G), and thereby the second voltage Va+Vk+Vy applied in the address interval (G–K) can be lowered.

Industrial Applicability

As described above, according to a driving method of a surface discharge type alternating current plasma display panel of the present invention, the wall charges to be removed are accumulated by the facing discharge in the reset step. Accodingly, the light of relatively low brightness is emitted from the pixels unselected in each sub-field, to thereby increase the contrast of the display screen. Also, there are residual wall charges on only the address electrodes after the reset step, and thereby the voltage applied in the address interval can be lowered.

The present invention is not limited to the illustrated embodiment and many changes and modifications can be made within the scope of the invention by a person skilled in the art.

What is claimed is:

[1. A method of driving a surface discharge plasma display panel having a first substrate and a second substrate space apart and facing each other, and common electrodes, scan electrodes, and address electrodes arranged between said first and second substrates, said common electrodes being arranged in parallel with said scan electrodes, said address electrodes being arranged orthogonal to said common electrodes and said scan electrodes to form respective intersections which each define a corresponding pixel, comprising:

a resetting step of applying a first voltage between the scan electrodes and the address electrodes to accumulate wall charges in the respective pixel by a facing discharge between the scan and address electrodes, and removing the wall-charges accumulated by the facing discharge;

an addressing step of applying a second voltage between a corresponding scan electrodes and selected address electrodes so that a facing discharge occurs, to form wall-charges in the selected pixels; and a sustained discharging step of applying a third alternating-current voltage between the scan electrodes and the common electrodes so that a surface discharge occurs in the selected pixels.]

2. A method of driving a surface discharge plasma display panel having a first substrate and a second substrate space apart and facing each other, and common electrodes, scan electrodes, and address electrodes arranged between said first and second substrates, said common electrodes being arranged in parallel with said scan electrodes, said address electrodes being arranged orthogonal to said common electrodes and said scan electrodes to form respective intersections which each define a corresponding pixel, comprising:

a resetting step of applying a first voltage between the scan electrodes and the address electrodes to accumulate wall charges in the respective pixel by a facing discharge, and removing the wall-charges accumulated by the facing discharge;

an addressing step of applying a second voltage between a corresponding scan electrodes and selected address electrodes so that a facing discharge occurs, to form wall-charges in the selected pixels; and a sustained discharging step of applying a third alternating-current voltage between the scan electrodes and the common electrodes so that a surface discharge occurs in the selected pixels;

wherein the resetting step includes:

a first resetting step of applying a fourth voltage between the scan electrodes and the common electrodes, and thereby remove remnant wall-charge from a previous sub-field, said fourth voltage has an opposite polarity to a voltage applied last in the sustained discharging step;

a second resetting step of applying said first voltage between the scan electrodes and the address electrodes, and thereby cause the facing discharge in the respective pixel selected from a previous sub-field; and a third resetting step of applying a fifth voltage between the scan electrodes and the address electrodes, and thereby remove wall-charges accumulated by the facing discharge, said fifth voltage has an opposite polarity to said first voltage and lower than said first voltage.

3. The driving method of claim 2, wherein said third resetting step is shorter than said first and second resetting steps.

4. The driving method of claim 3, wherein said third resetting step is repeated.

*5. A method of driving a plasma display panel that includes a first substrate and a second substrate spaced apart and facing each other, and common electrodes, scan electrodes, and address electrodes arranged between the first substrate and the second substrate, the method comprising:*

*resetting the plasma display panel by:*

*applying a fourth voltage between the scan electrodes and the common electrodes, said fourth voltage having an opposite polarity to a voltage applied last in a sustained discharging step and thereby remove remnant wall-charge from a previous sub-field;*

*applying a first voltage between the scan electrodes and the address electrodes; and*

*applying a fifth voltage between the scan electrodes and the address electrodes, said fifth voltage having an opposite polarity to said first voltage;*

*addressing the plasma display panel by applying a second voltage between corresponding scan electrodes and selected address electrodes; and*

*causing sustained discharge in the plasma display panel by applying a third alternating-current voltage between the scan electrodes and the common electrodes.*

*6. The method of claim 5, wherein said fifth voltage is lower than said first voltage.*

*7. The method of claim 5, wherein said applying a fifth voltage is repeated.*

*8. The method of claim 5, wherein said first voltage is greater than said third voltage.*

*9. The method of claim 5, wherein the method is performed in order.*

* * * * *